(12) United States Patent
Shin

(10) Patent No.: US 8,844,857 B2
(45) Date of Patent: Sep. 30, 2014

(54) PRETENSIONER FOR SEAT BELT

(75) Inventor: Dal Soo Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 205 days.

(21) Appl. No.: 13/526,079

(22) Filed: Jun. 18, 2012

(65) Prior Publication Data

US 2013/0126655 A1    May 23, 2013

(30) Foreign Application Priority Data

Nov. 23, 2011 (KR) ........................ 10-2011-0122876

(51) Int. Cl.
*B65H 75/48* (2006.01)

(52) U.S. Cl.
USPC ............................................ 242/374; 60/632

(58) Field of Classification Search
CPC ..................... B60R 22/4628; B60R 22/4633
USPC .......................................... 242/374; 60/632
See application file for complete search history.

(56) References Cited

U.S. PATENT DOCUMENTS

| | | | |
|---|---|---|---|
| 7,624,940 B2 * | 12/2009 | Kitazawa et al. | 242/374 |
| 2004/0169105 A1 * | 9/2004 | Wier | 242/374 |
| 2005/0189753 A1 * | 9/2005 | Kato et al. | 280/741 |
| 2010/0051733 A1 * | 3/2010 | Yamada | 242/374 |

FOREIGN PATENT DOCUMENTS

| | | | | |
|---|---|---|---|---|
| EP | 1227016 A1 * | 7/2002 | | 242/374 |
| JP | 2005225274 A | 8/2005 | | |
| KR | 1020070009635 A | 1/2007 | | |

* cited by examiner

*Primary Examiner* — Sang Kim
(74) *Attorney, Agent, or Firm* — Morgan, Lewis & Bockius LLP

(57) ABSTRACT

A pretensioner for a seat belt is configured to reduce injury by preventing load applied to the passenger's chest from increasing may include a pinion connected to a cylindrical spool wound with a webbing, a cylinder receiving a rack engaged with the pinion, a micro gas generator disposed in the cylinder and rotating the pinion by moving the rack with an explosion due to an external shock, a generator cap covering the outer circumferential edge of the cylinder and preventing the micro gas generator from separating outside, and a guide blade that guides gas discharged through vent holes to the outside is formed on the outer circumferential edge of the micro gas generator.

4 Claims, 6 Drawing Sheets

PRETENSIONER FOR SEAT BELT

CROSS-REFERENCE TO RELATED APPLICATION

The present application claims priority of Korean Patent Application Number 10-2011-0122876 filed Nov. 23, 2011, the entire contents of which application is incorporated herein for all purposes by this reference.

BACKGROUND OF INVENTION

1. Field of Invention

The present invention relate to a pretensioner for a seat belt. More particularly, it relates to a pretensioner for a seat belt that reduces injury of the passenger's chest by preventing load applied to the passenger's chest from increasing, by allowing a compressed gas, which is generated in a cylinder when a rack used for the pretensioner moves down, to be discharged to the outside while rotating along a spiral guide blade formed in a micro gas generator.

2. Description of Related Art

Vehicles are generally equipped with three-point type of seat belts composed of a waist belt 10 surrounding the waist of a passenger and a shoulder belt 20 surrounding a shoulder and the chest of the passenger, a shown in FIG. 1, in order to safely protect a driver and passengers in an accident.

The seat belt is designed to be locked in a collision of a vehicle, but the belt is loosened rather than fastened for a short time until before the belt is wound from the collision, such that the passenger may be released from the seat and hit against the windshield or the side of the door.

A pretensioner that is one of means for actively winding the loosened belt winds back a belt by using the explosion force of an MGG (Micro Gas Generator), by sensing a shock generated in a vehicle.

A typical pretensioner using explosion pressure uses a rack and a pinion, in which the rack 60 inserted in a cylinder 50 is engaged with a pinion 70. In an accident, a micro gas generator 51 explodes and discharges an expansion gas into the cylinder 50, such that the rack 60 is pushed back and the pinion 70 is rotated by the pressure.

The rotational force of the pinion 70 is transmitted to a cylindrical spool wound with the webbing of a seat belt through a clutch unit, such that the spool is reversed within a short time, thereby winding the belt.

The operation of a pretensioner of the related art is described with reference to FIGS. 2A-2E. When a current is applied to an MGG in a car collision, powder explodes and pushes up the rack 60 (*a*). As the rack 60 moves up, the pinion 70 engaged with the rack rotates and winds a cylindrical spool 90 wound with the belt, such that a passenger is rapidly restricted (b).

When energy is transmitted to the passenger and the upper body moves forward, the pinion 70 is reverses and the rack 60 moves down to reduce the load transmitted to the passenger's chest by the spool 90. The gas in the cylinder 50 is compressed by the rack 60 moving down and the compressed gas interferes with the moving-down of the rack, such that the passenger's chest is pressed (c).

Thereafter, as the rack 60 keeps move down, the gas is maximally compressed and the load applied to the passenger's chest increases, such that the passenger's chest is more injured.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a pretensioner for a seat belt that reduces an injury of the passenger's seat by allowing a compressed gas, which is generated in a cylinder by moving-down of a rack when the rack of the pretensioner is moved down to loosen seat belt wound around a spool, to flow along a spiral guide blade formed in a micro gas generator (MGG) and to be discharged to the outside through a vent hole formed through a generator cap.

Various aspects of the present invention provide for a pretensioner for a seat belt that may include a pinion connected to a cylindrical spool wound with a webbing of a seat belt, a cylinder receiving a rack engaged with the pinion, a micro gas generator disposed at a side in the cylinder and rotating the pinion by moving the rack with an explosion due to an external shock, and a generator cap covering the outer circumferential edge of the cylinder and preventing the micro gas generator from separating outside, in which a guide blade that guides the gas discharged out from the cylinder is formed on the outer circumferential edge of the micro gas generator.

The guide blades may be spirally formed on the outer circumference of the micro gas generator and vent holes for discharging the gas in the cylinder along the guide blades are formed at the generator cap.

Since the compressed gas may be generated in the cylinder by the rack of the pretensioner which is used for the pretensioner flows along the spiral guide blades formed on the micro gas generator (MGG) and is discharged outside through the vent holes formed at the generator cap, it is possible to prevent the passenger's chest from being injured by reducing the load transmitted to the passenger's chest, and since the compressed gas is discharged while turning, it is possible to further reduce an injury of the passenger by dispersing energy by preventing earlier load reduction.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
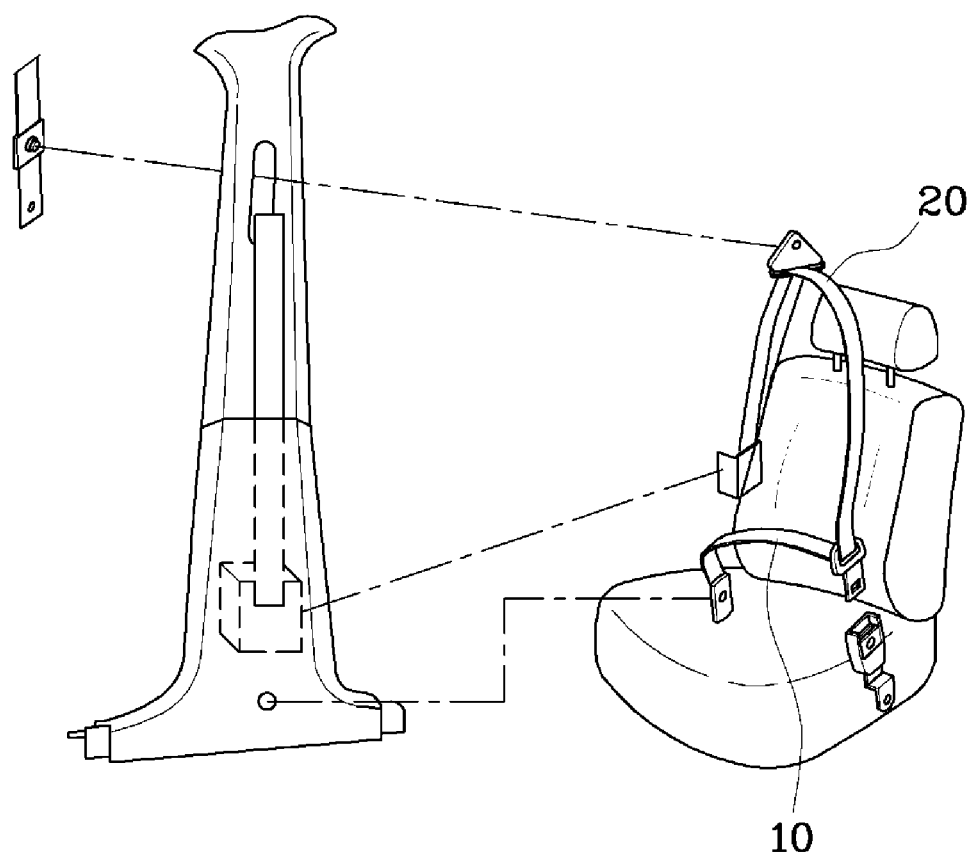
FIG. 1 is a view showing the configuration of a seat belt of the related art.
Figure 2A:
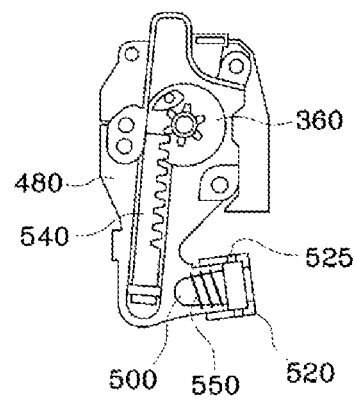
FIGS. 2A, 2B, 2C, 2D and 2E are views illustrating the operation of a pretensioner of the related art.
Figure 2B:
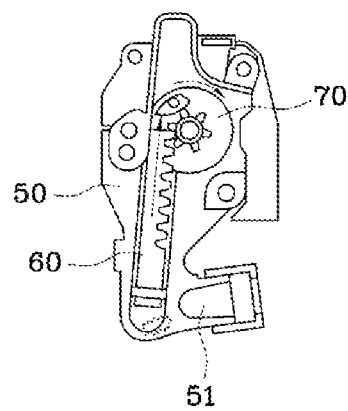
Figure 2C:
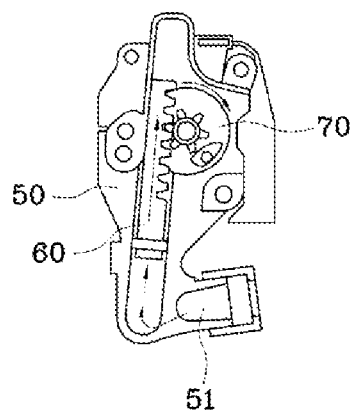
Figure 2D:
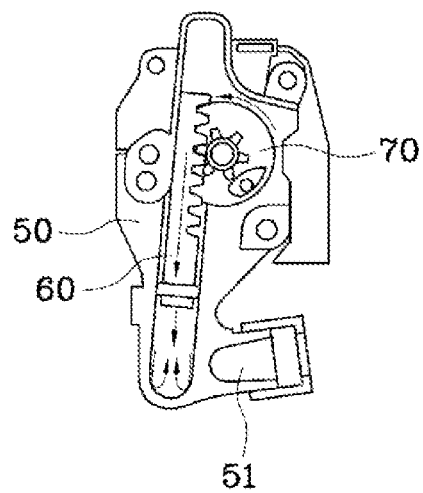
Figure 2E:
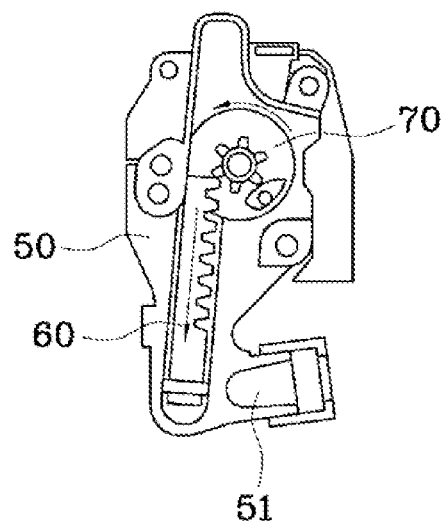

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a pretensioner for a seat belt of the present invention will be described in detail with reference to the accompanying drawings. In describing the present invention, well-known functions or constructions will not be described in detail since they may obscure the understanding of the present invention. Further, the terminologies described below were defined in consideration of the function of the present invention and may be different in accordance with the intention of the manufacturers of products or the custom.

Further, the thicknesses of the lines and the sizes of the components shown in the drawings may be exaggerated for the clarity and convenience of description, the embodiments described herein and the configurations shown in the drawings are merely exemplary embodiments; therefore, it should be understood that there may be various equivalents and modifications, which can replace the invention at the time of application.

A pretensioner for a seat belt according to the present invention is designed such that a pinion reverses to loosen the webbing of a seat belt and a rack moves down in a cylinder, such that a compressed gas generated by the rack moving down in the cylinder is easily discharged to the outside.

Figure 3:
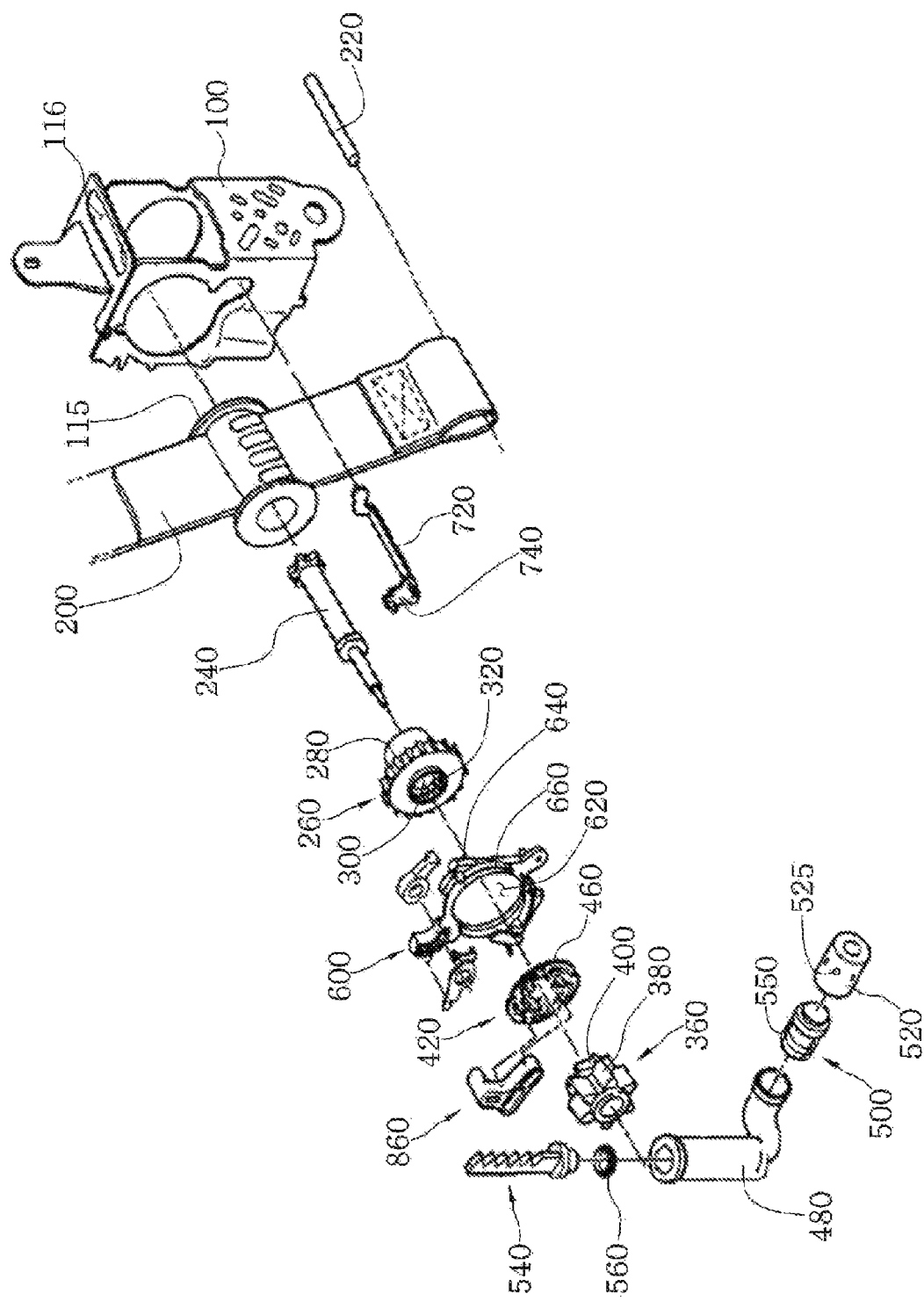
FIG. 3 is a perspective view of an exemplary pretensioner and a winding mechanism wound with the webbing of a seat belt.
Figure 4A:
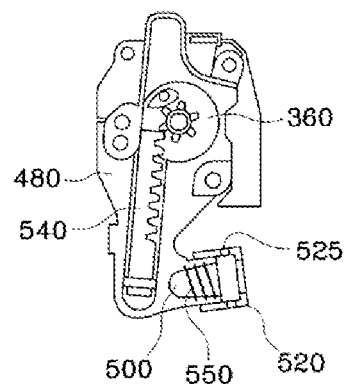
FIGS. 4A, 4B, 4C, 4D and 4E are views illustrating the operation of an exemplary pretensioner according to the present invention.
Figure 4B:
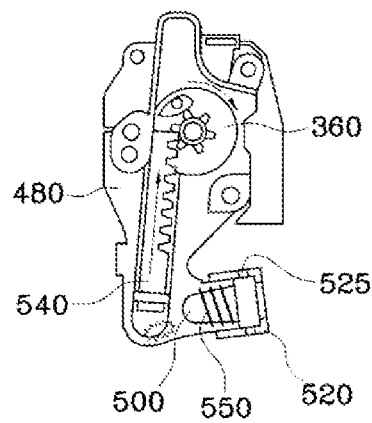
Figure 4C:
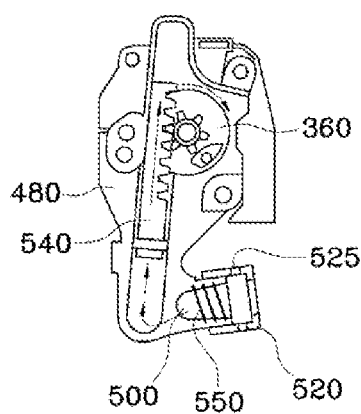
Figure 4D:
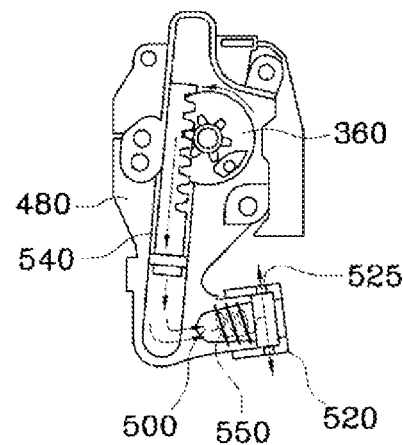
Figure 4E:
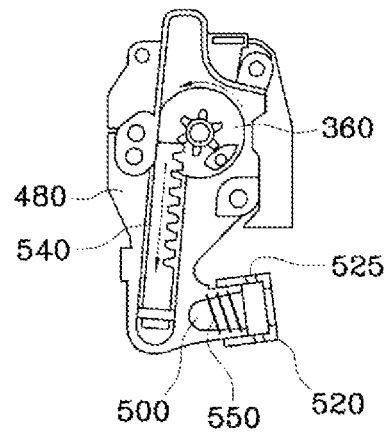

FIG. 3 is an exploded perspective view of a pretensioner and a winding mechanism wound with a webbing of a seat belt and FIGS. 4A-4E are views illustrating the operation of a pretensioner according to the present invention.

A pretensioner of the present invention includes a pinion connected to a cylindrical spool wound with a webbing of a seat belt, a cylinder receiving a rack engaged with the pinion, a micro gas generator (MGG) disposed at a side in the cylinder and rotating the pinion by moving the rack with an explosion due to an external shock, and a generator cap covering the outer circumference of the cylinder and preventing the micro gas generator from separating outside, in which guide blades that guide the gas discharged out from the cylinder are formed on the outer circumference of the micro gas generator.

Before describing the pretensioner according to the present invention, a winding mechanism that winds a webbing of a seat belt and a pretensioner connected to the winding mechanism are described.

The spool 115 is fixed in a vehicle and disposed rotatably between a side and the other side of a frame 100 having a U-shaped plate shape when seen from above. A webbing 200 of a seat belt is wound around the spool 115.

A rod-shaped shaft 220 disposed at one end of the webbing 200 is connected and supported to the spool 115. Further, the webbing 200 passes through the spool 115 positioned close to the end described above. Accordingly, the webbing 200 is connected and supported to the spool 115. Further, the webbing 200 is placed around a passenger in a vehicle, passing through an insertion slot 116 close to the portion wound around the spool 115. The webbing is wound with rotation in the winding direction of the spool 115 and unwound with rotation in the unwinding direction of the spool 115.

Further, an energy absorber 240 is disposed on the central axis of the spool 115 and can be twisted when a predetermined amount of or more load is applied, in which the other end of the energy absorber 240 is connected and supported to the other end of the spool 115. The energy absorber 240 integrally rotates with the spool 115.

A lock gear 260, which is a rotary member, is disposed at a side of the spool 115 and connected and supported to a portion close to an inlet of the energy absorber 240, such that the lock gear 260 integrally rotates with the energy absorber 240 and the spool 115 unless energy absorber 240 is twisted.

Further, teeth 280 are formed around outer circumference of the lock gear 260, a cylindrical hole 300 that is open to a side is formed on the central axis, and a knurled surface 320 is formed around the entire outer circumference of the hole 300.

Further, a pretensioner using a rack and a pinion is disposed at the outside of a side of the frame 100. The pinion 360 is rotatably supported by the energy absorber 240 and has pinion teeth 380 at a side. Meanwhile, a cam 400 is formed on the other side of the pinion 360, and protrusions and recessions are alternately formed on the outer circumference of the cam.

The cam 4000 is inserted in the hole 300, not in contact with the surface 320. Therefore, the lock gear 260 can rotate independently from the pinion 360.

Further, a clutch plate 420 is disposed between the lock gear 260 and the pinion 360 and a plurality of connecting protrusions (not given reference numerals) is formed at the center of the clutch plate 420. The connecting protrusions (not given reference numerals) protrude in the other direction of the clutch plate 420 and fitted in the recessions of the cam 400, respectively. Accordingly, the clutch plate 420 is fastened to the pinion 360 and the connecting protrusions (not given reference numerals) are inserted in the hole 300, together with the cam 400. The connecting protrusions (not given reference numerals) are not in contact with the surface 320. Therefore, the lock gear 260 can rotate independently from the clutch plate 420 and a plurality of grooves 460 is formed on the outer circumference of the clutch plate 420.

Further, a cylinder 480 fixed to a side of the frame 100 is disposed under the pinion 360.

Further, a micro gas generator 500 is disposed in the lower end of the cylinder 480 and a generator cap 520 that prevents the micro gas generator 500 from separating is fitted on the lower end of the cylinder 480 in which the micro gas generator 500 is disposed.

Guide blades are spirally formed on the outer circumference of the micro gas generator 500 and a plurality of vent holes 525 for discharging the gas in the cylinder through the guide blades 550 is formed at the generator cap 520.

It should be understood that the number of revolutions or the thickness of the guide blades 550 spirally formed on the outer circumference of the micro gas generator 500 and the size of the vent holes 525 formed at the generator cap 520 may be appropriately adjusted.

Further, the rack 540 is disposed in the cylinder 480 in a piston-like manner, in which the rack 540 is inserted into the cylinder 480 from the upper end of the cylinder 480. Further, an O-ring 560 that seals the portion between the lower end of the rack 540 and the cylinder 480 is disposed at the lower end of the rack 540.

Further, a gear case 600 having a circular through-hole at the center to cover a side of the lock gear 260 is disposed on a side of the frame 100. The through-hole 620 exposes the through-hole 300 of the lock gear 260, a flat plate-shaped stopper plate is vertically disposed at the upper end of the gear case 600, and a curved-plate-shaped guide plate 600 is vertically disposed around the gear case 600.

Further, the stopper plate 640 of the guide plate 600 extends in the winding direction from the lower end along the outer circumference of the through-hole 620 and a receiving hole that is open to a side is formed at the inclined upper portion of the gear case 600. The receiving hole is formed in a rectangular prism bending in an arc shape and a compression coil spring, which is a pressing member, is received in the receiving hole.

A lock member 720 is held between a side and the other side of the frame 100 and a lock plate 740 is disposed at one end of the lock member 720. The lock plate 740 is supported by the lower portion of the gear case 600 to be rotatable with respect to one end and disposed at an angle at the lower portion of the lock gear 260.

Further, a lock stopper 860, which is a movable member, is disposed at a side of the clutch plate 420 and the lock stopper 860 is formed in a rectangular prism shape bending along the outer circumference of the through-hole 620 of the gear case 600.

The operation of the pretensioner using the rack and the pinion, which are the features of the present invention, in the winding mechanism having the configuration described above is described hereafter with reference to FIGS. 4A-4E.

First, when a car collision occurs, a current is applied to the micro gas generator 500 disposed at the lower portion in the cylinder 480 and an explosion is generated, such that an explosion gas is discharged into the cylinder by the explosion and the rack 540 is moved up.

As the rack 540 moves up, the pinion 360 engaged with the rack is rotated and the spool 115 connected with the webbing of a seat belt is rotated by the rotational force, such that the webbing of the seat belt is wound and rapidly restricts a passenger.

Thereafter, energy is transmitted to the passenger and the upper body of the passenger moves forward, the pinion 360 reverses to reduce the load transmitted to the passenger's chest and the rack 540 moves down, such that the gas in the cylinder is compressed by the rack 540 moving down.

The gas compressed by the rack 540 flows along the guide blades 550 spirally formed on the outer circumference of the micro gas generator 500 and is discharged outside through the vent hole 525 formed on the generator cap 520, thereby preventing the load transmitted to the passenger's chest from increasing.

Further, since the compressed gas is not discharged straight, but discharged while turning around the guide blades 550, energy is dispersed by preventing the earlier reduction of a load, such that it is possible to reduce an injury of the passenger.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pretensioner comprising:
   a pinion connected to a cylindrical spool wound with a webbing of a seat belt;
   a rack piston operably engaged with the pinion;
   a gas cylinder telescopically receiving the rack piston;
   a micro gas generator fluidly connected to the gas cylinder to move the rack piston and rotate the pinion with an expansion of gas generated by the MGG; and
   a generator cap enclosing the micro gas generator therein and connected to the gas cylinder;
   a guide blade formed on an outer circumference of the micro gas generator to guide gas discharged from the gas cylinder; and
   vent holes formed on the generator cap for discharging the gas in the gas cylinder along the guide blades to the outside.

2. The pretensioner of claim 1, wherein the guide blade is spirally formed on the outer circumference of the micro gas generator.

3. The pretensioner of claim 1, comprising a plurality of guide blades formed on an outer circumference of the micro gas generator to guide gas discharged from the gas cylinder.

4. The pretensioner of claim 1, wherein the plurality of guide blades are spirally formed on the outer circumference of the micro gas generator.

* * * * *